United States Patent [19]

Busch

[11] 4,002,924
[45] Jan. 11, 1977

[54] DEVICE FOR MEASUREMENT AND/OR CONTROL OF TEMPERATURE

[75] Inventor: Dieter K. Busch, Wollstadt, Germany

[73] Assignee: VDO Adolf Schindling AG, Frankfurt, Germany

[22] Filed: Oct. 11, 1974

[21] Appl. No.: 514,103

[30] Foreign Application Priority Data

Oct. 17, 1973 Germany ............................ 2352073

[52] U.S. Cl. ............................... 307/117; 219/505; 340/57; 317/101 C
[51] Int. Cl.² .................. H01H 35/00; H01H 83/00
[58] Field of Search ................ 73/362 AR, 362 SD, 346–348; 307/117; 219/505, 501; 340/57; 317/101 R, 101 C

[56] References Cited

UNITED STATES PATENTS

| 3,044,296 | 7/1962 | Boddy | 73/362 AR |
| 3,541,278 | 11/1970 | Roberts | 210/51.1 |
| 3,581,062 | 5/1971 | Aston | 219/505 |

*Primary Examiner*—David Smith, Jr.
*Attorney, Agent, or Firm*—Otto John Munz

[57] ABSTRACT

A device for electric temperature measurement and/or control has a thermo-sensitive element, preferably a temperature-responsive resistance element in the shape of a disc, pill, or the like. The element is mounted in a tubular sensing case which is closed by means of connection-contacts supporting a cover, and furthermore comprising an electronic switch connected to the said element, for producing a signal that varies continuously or intermittently in response to temperature changes.

4 Claims, 1 Drawing Figure

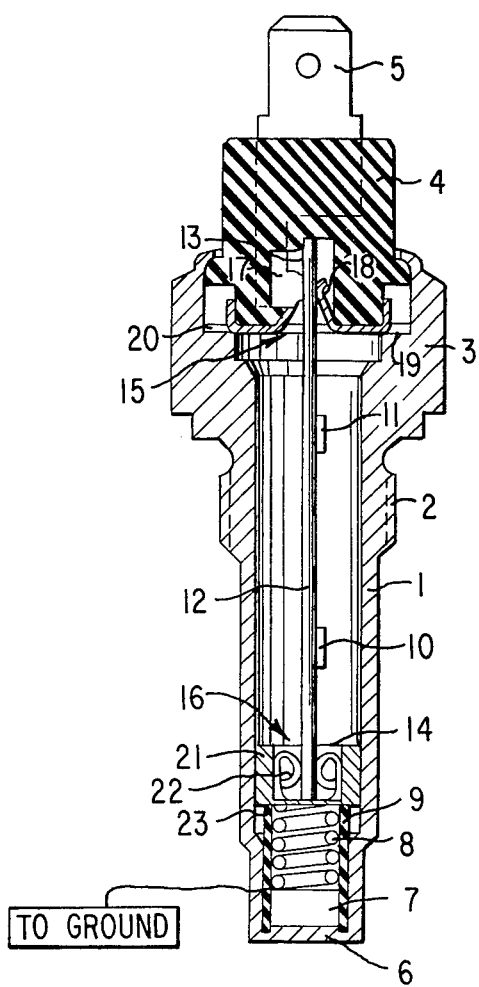

DEVICE FOR MEASUREMENT AND/OR CONTROL OF TEMPERATURE

DESCRIPTION OF THE PRIOR ART

Electric temperature measurement and temperature control devices are already known with a temperature-responsive resistance element mounted in a tubular sensing case, provided with a screw thread. The resistance element is either a resistance wire wound on a cylindrical coil which passes through the tubular sensing case in the direction of the longitudinal axis, or a semiconductor of the so-called cold conductor or hot conductor type. The conductor is shaped as a disc or pill and is arranged at the bottom of the sensing case. The resistance element is connected to the connection contacts positioned in the cover of the sensing case, to which contacts is connected a switch circuit, generally positioned at a substantial distance from the sensing case. The constructional units of the switching circuit are arranged on a printed-circuit board. When the device is intended for temperature control, the electronic switch circuit includes a threshold value switch and possibly an amplifier. When the device serves for continuous temperature control, it contains a bridge circuit, possibly with a sum-and-difference amplifier. The temperature sensing device and the switch circuits are two separate units.

These known temperature measurement and temperature control devices have the disadvantage that their installation is complicated and time-consuming with long electric wire lines required, whose orderly placement may lead to difficulties. In order to make it possible, for instance, to use the device in motor vehicles, so that a temperature switching circuit responds to the radiator temperature and control the fan motor adjacent to the radiator two lines must lead from the temperature switching device to the dashboard where the switching circuit is mounted, and two additional lines run from there back to the fan motor. In such a wiring, interference voltages are often induced in the lines between the temperature-sensing device and the switching circuit which lead to errors in measurement or control. The elimination of such errors is expensive.

SUMMARY OF THE INVENTION

These difficulties and disadvantages of the prior art are overcome by the invention. The primary objects of the invention are to provide an electric temperature measurement and/or control device of a minimum volume necessary and permitting installation that can be carried out easily and speedily, with a minimum effort of labor and mechanical skill. In order to achieve the objects of the invention, also new concepts of designing the necessary parts had to be invented. According to the invention, the circuit is constructed as thin or thick film circuit, with at least one integrated circuit (IC) on an oblong substrate body. The substrate body is mounted in the sensing case centrally located in the direction of the longitudinal axis thereof and is held in the cover in at least one support.

According to the invention, the temperature sensing device and the switching circuit are combined into a single unit with a structural volume of a size only slightly larger than that of the temperature sensing element alone of the devices of the prior art; the installation of the temperature measurement and/or control device is limited to the fastening of the temperature sensing element to the unit the temperature of which is to be controlled, generally simply by screwing it into a screw thread in the unit, and by connecting only two lines. The economy of installation time and material savings achieved by the invention is particularly noticeable since the device is designed for mass-manufacture. The switching circuit can be manufactured at low cost. This is particularly true when the device is intended to be installed in motor vehicles.

In anticipation of the high shock and vibration stresses which the device must withstand, the invention provides for holding the substrate body in a further support at the end adjacent to the bottom of the sensing case.

As an additional inventive feature to facilitate manufacture and assembly, the substrate body is provided at each supported end with contact surfaces and each support is constructed as an electric plug connection. This is particularly suitable for a device of the type described in which the thermo-sensitive element is a temperature-responsive resistance element shaped as a disc, pill, or the like, and is held, at the bottom of the sensing case by means of a spring utilized as a lead-in wire. The reason therefor is that the resistance element is then connected with the addition of a second support in a particularly simple manner to the switching circuit. In a preferred embodiment this is done by providing the second support, adjacent to the bottom of the sensing device, with a contact element for the spring. The support serves in this structure also as an abutment for the spring.

BRIEF DESCRIPTION OF THE DRAWING

The sole figure of the drawing shows a longitudinal cross section in a partly diagrammatical representation, as a preferred embodiment of the device of the invention drawn to scale of 2:1.

DESCRIPTION OF THE PREFERRED EMBODIMENT

The temperature switch circuit comprises a tubular metal case 1 provided with a threaded coupling 2 and a hexagon head 3. The case 1 is closed at its upper end with a dielectric plug or cover 4 having a central recess in which are mounted connection contacts 5. On the bottom 6 of case 1 is located a resistance 7 shaped as a disc and held by a grounded spring 8. The resistance element preferably is a negative thermal coefficient (NC) resistance. An insulating material sleeve 9 is provided for the electric insulation of spring 8 with relation to case 1. The sleeve serves also to center the resistance element and the spring in the case.

The switch circuit of the temperature control device is electronic and is constructed as a thin or a thick film circuit with two integrated circuits 10 and 11 on an oblong elongated ceramic substrate body 12. The switch is a threshold value switch provided with an amplifier. The substrate body is arranged in the case in the direction of its longitudinal axis and in central position. The substrate body is provided at each end with a contact surface 13 and 14 respectively and is inserted with these ends in an upper and a bottom plug connection 15 and 16, respectively. The upper plug connection is mounted in a cover and includes a contact arm 17 molded to one of the connection contacts 5 and at least one leaf spring 18. The leaf spring presses the contact surface 13 against the contact arm. A spring plate 20 is clamped in between the cover and a shoulder 19 of the hexagon head 3, and the leaf spring is punched out and bent off from the spring plate.

The bottom plug connection 16 adjacent to the bottom of the case has a body 21 of an insulating material with a cylindrical outer surface. A leaf spring 22, bent into a double kidney type shape is fastened in the insulating body. A projection 23 of the leaf spring 22 extends in an edge recess in the insulating body downwardly, and continues as a rectangular bend, parallel to the bottom side of the insulating body. It is conductively connected to the spring.

The construction of electronic switches either as thin or thick film circuits with one or more Integrated Circuits (IC) for producing signals that vary with temperature changes intermittently or continuously are well known per se to the prior art, as classified in class 317-234 and 235. A Negative Thermal Coefficient (NTC) resistance and a threshold value switch are also well known to the prior art.

A threshold value switch operates on a minimum level for which there is a measurable output. Thick and thin film circuits are generally accepted technical terms in the art.

What is claimed is:

1. A unitary temperature sensing and control device comprising, an elongated tubular metallic casing having a central longitudinal axis and an integral closure sealing its first end, a first dielectric sleeve fitting said casing and disposed contiguous to said first end, a solid state temperature sensing element fitting said first sleeve and making electrical contact with said closure, a plug closing the otherwise open second end of said casing and having an internal recess on said axis and an embedded external contact having a portion disposed in said recess, an elongated substrate body in said casing extending along said axis and having its first end adjacent said first sleeve and its second end in said recess in contact with the contact portion of said plug, an electronic integrated control circuit fixed with and extending along said substrate body from one end thereof to the other, and an electrically conductive spring in said first sleeve in contact at its respective ends with (a) said temperature sensing element and (b) said first end of said substrate and the contiguous end of said control circuit, said spring acting to urge said element into contact with the integral closure of said casing, and said substrate into limiting axial position in said recess for making electrical connection between said element and circuit.

2. The device of claim 1, and resilient means engaging the first end of said substrate at points circumferentially spaced about said axis, and urging said first end of the same radially to center on said axis.

3. The device of claim 2, and a second sleeve of dielectric material interposed between the wall of said casing and forming one abutment for said resilient means.

4. The device of claim 3, and leaf spring means fixed with said plug and having a portion extending into said recess, to engage and urge the second end of said substrate into engagement with the contact portion therewithin.

* * * * *